United States Patent

[11] 3,549,898

[72] Inventor Kenneth W. Nelson
Mountain View, Calif.

[21] Appl. No. 838,439
[22] Filed July 2, 1969
[45] Patented Dec. 22, 1970
[73] Assignee Sylvania Electric Products Inc.
a corporation of Delaware

[54] PULSE GENERATOR
8 Claims, 3 Drawing Figs.

[52] U.S. Cl. 307/106
[51] Int. Cl. H03k 3/00
[50] Field of Search 307/106, 107, 108, 109; 333/(Inquired); 331/(Inquired)

[56] References Cited

UNITED STATES PATENTS 2,820,909 1/1958 Plouffe, Jr. 308/106

*Primary Examiner*—Robert K. Schaefer
*Assistant Examiner*—H. J. Hohauser
*Attorneys*—Norman J. O'Malley, John F. Lawler and Russell A. Cannon

ABSTRACT: This pulser comprises a delay line storage element which is an open-circuited coaxial transmission line having a center conductor connected to the collector electrode of a common emitter avalanche transistor switch. The outer conductor of the delay line is connected through an impedance step-up transformer to a gate circuit comprising a chain of pairs of series and shunt diodes. The gate circuit reduces the amplitude of the trailing edge of the voltage pulse by bypassing this signal from the output circuit. The output pulse is coupled from the gate circuit through an impedance step-down transformer. The transformers are employed to enhance the effect of the shunt diodes when they are conducting to bypass the signal. The emitter electrode of the avalanche transistor is directly electrically connected to ground to improve the temperature stability of the pulser.

PATENTED DEC 22 1970

3,549,898

INVENTOR.
KENNETH W. NELSON

BY Russell A. Cannor
AGENT

PULSE GENERATOR

BACKGROUND OF INVENTION

This invention relates to signal generators and more particularly to a pulser for generating a DC pulse.

A pulser basically comprises an energy source, a charging impedance, an energy storage element, and a switch. The storage element stores energy at a rate which is determined by the charging impedance. At a prescribed time, the switch is closed and the stored energy is dumped to form a pulse. The output of a pulser typically has a shape similar to that illustrated by the waveform of FIG. 1. The pulse 1 has steep leading and trailing edges. The voltage transient or ringing indicated at 2 is baseline noise that is present in the output after termination of the pulse. It is caused by charging the delay line in the reverse direction during discharge thereof.

In a prior art pulser comprising a coaxial delay line storage element connected to the collector electrode of a common collector mode avalanche transistor, a second coaxial delay line storage element is employed in the base circuit to abruptly cut off the transistor and terminate the pulse. The output pulse is developed across a resistive load in the emitter circuit of the transistor switch and is coupled from the pulser through a gate comprising a series and a shunt clipping diode. These diodes are ineffective in suppressing baseline noise in the trailing edge of the output pulse so that this circuit is not satisfactory for use in radar type applications where it is necessary to receive and analyze signals reflected from targets at close range. This circuit is also sensitive to temperature variations.

SUMMARY OF INVENTION

An object of this invention is the provision of an improved pulser providing a stable output which is relatively constant over a broad range of temperatures.

Another object is the provision of an improved pulser having low baseline noise in the output thereof.

In accordance with this invention, impedance transformers are employed to raise the impedance levels of the output and the storage switch circuits of a pulser with respect to the saturation impedances of diodes bypassing unwanted signal voltages to ground. The pulser switch circuit is an avalanche transistor connected in the common emitter mode.

DESCRIPTION OF PREFERRED EMBODIMENT

Figure 2:
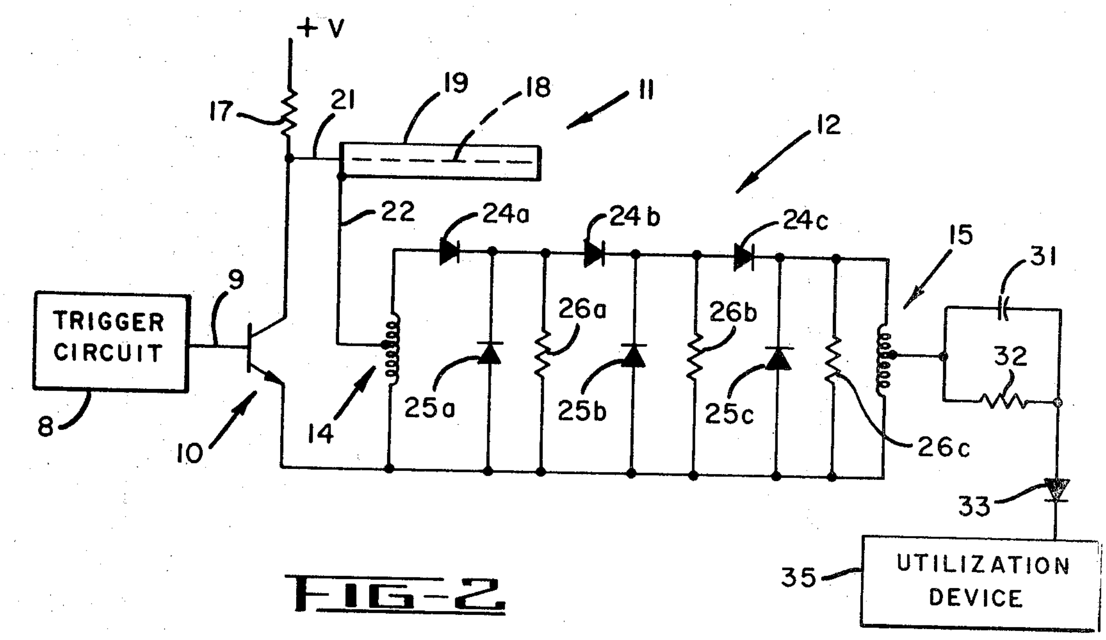
FIG. 2 is a schematic circuit and block diagram of a pulser embodying this invention.
Figure 1:
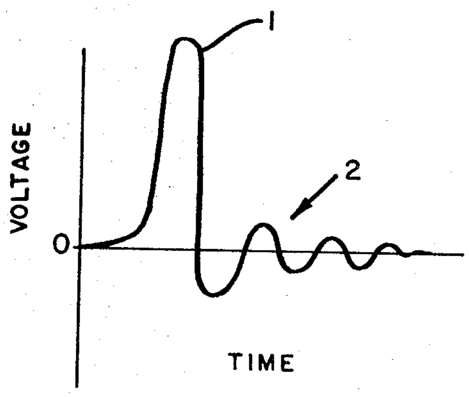
FIG. 1 is a waveform representing a pulse produced by a typical pulser.

Referring now to FIG. 2, a pulser embodying this invention comprises transistor switch 10, delay line storage circuit 11, diode gate circuit 12, and impedance transformers 14 and 15.

Transistor switch 10 is an avalanche transistor connected in the common emitter mode with its emitter electrode directly electrically connected to a ground reference potential. This circuit configuration allows the establishment of a firm base-emitter voltage which is necessary for operation of the circuit to be relatively independent of temperature variations. The output of trigger circuit 8 is coupled to base electrode 9 and controls the operation of the transistor switch. The collector electrode is electrically connected through charging resistor 17 to a positive voltage source +V.

Storage element 11 is a length of coaxial transmission line having a 50 ohm characteristic impedance, an inner conductor 18 and an outer conductor 19. The electrical length $\tau/2$ of the transmission line is one-half the width $\tau$ of the output pulse produced by the pulser. One end of center conductor 18 is connected through line 21 to the collector electrode of the avalanche transistor. The transmission line is terminated at the the other end thereof in an open circuit. Outer conductor 19 is connected through line 22 and a winding of transformer 14 to the ground reference potential.

Gate circuit 12 comprises three pairs of diodes. The diodes are preferably hot carrier (Schottky effect) diodes which have large and small shunt capacitances when zero and reverse voltages, respectively, are impressed across them. Each diode pair comprises a series diode 24 and a shunt diode 25. The diodes 24*a*, 24*b* and 24*c* are connected in series with the output of the delay line on line 21 so that they conduct when the delay line output voltage is positive. Shunt diodes 25*a*, 25*b* and 25*c* are each connected between the cathode electrode of the associated series diode and the ground reference potential so that they conduct if a negative voltage is passed by the series diodes. A resistor 26 is connected in parallel with each of the shunt diodes 25.

Impedance transformers 14 and 15 are connected to opposite ends of gate circuit 12 to step up the 50 ohm characteristic impedances of associated circuitry connected thereto to 200 ohms as viewed by circuit 12. The tap of transformer 15 is coupled through the parallel circuit comprising capacitor 31 and resistor 32 and through diode 33 to utilization device 35 which may, by way of example, be a hybrid and an antenna circuit. Diode 33 is essentially an open circuit which blocks an applied signal when it is reverse biased. When the output of the pulser is positive, capacitor 31 stores a charge that aids in reverse biasing diode 33 when it is cut off.

Figure 3:
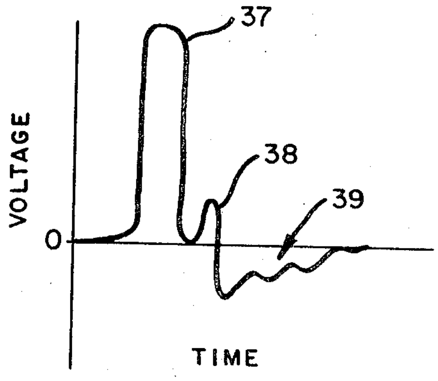
FIG. 3 is a waveform representing the pulse produced by the circuit of FIG. 2.

During quiescent operation, the output of the trigger circuit is a negative voltage which cuts off the avalanche transistor so that the capacitance of the transmission line delay line charges to the supply voltage +V. The collector electrode and the center conductor of the delay line are therefore at the supply voltage +V whereas the outer conductor, and thus the output voltage, is at the ground reference potential or 0 volts, see FIG. 3.

When a positive trigger pulse is applied to base electrode 9, transistor 10 is abruptly driven into saturation so that the transistor short circuits the delay line. The charge stored by the delay line is therefore rapidly discharged through line 21, transistor 10, transformer 14 and line 22. This operation causes a positive transient voltage to propagate down transmission line 11 toward the open circuited end thereof. A transient pulse of the opposite polarity is reflected from the open circuit and propagates back to the collector electrode to abruptly cut off the ta transistor and terminate the output pulse 37, see FIG. 3.

When transistor 10 conducts, the positive voltage developed across transformer 14 causes series diodes 24 and 33 to conduct to charge capacitor 31 and to pass the output pulse to utilization device 35. This positive voltage also reverse biases and cuts off shunt diodes 25 and causes a charge to be developed across the shunt capacitances of these diodes. By the time transistor 10 is cut off by the operation of the delay line, a charge of the opposite polarity, i.e., a negative voltage, may also be impressed on the delay line. This negative voltage is comprised of high frequency Fourier components. Although the series diodes 24 are reverse biased and cut off by this negative voltage, these diodes have a small shunt capacitance that passes these high frequency signal voltages. It is these bypassed high frequency signal components that account for the ringing or transient voltage response which is indicated at 38 and 39 in FIG. 3 and is produced after termination of the output pulse 37. These bypassed negative signal voltages cause diodes 25 to conduct to shunt these signals to ground. Conduction of diodes 25 also causes the capacitances thereof to discharge through and develop negative voltages across the associated shunt resistances 26 which make the output voltage at 39 negative. This causes a significant reduction in the baseline noise. Diode 33 is also cut off by the negative voltage that leaks through series diodes 24. The voltage developed across resistor 32 by discharge of capacitor 31 further increases the reverse bias across diode 33. This reduces the shunt capacitance of diode 33 and thus further decreases the magnitude of the ringing voltage 39 in the output.

The saturation impedances of diodes 25 are approximately 20 ohms, impedances that are much greater than a short circuit with respect to the 50 ohm characteristic impedances of the delay line—transistor switch circuit and the output circuit. Transformers 14 and 15 are employed to transform these 50 ohm impedances to 200 ohm impedances looking into gate circuit 12 in order to enhance the effect of the diodes 25 in shunting the negative signal voltages to ground. In an embodiment of this invention which was operated and tested, the base line noise was less than 2 millivolts 18 nanoseconds after the start of the output pulse. This represents a total improvement of 21 db. in the baseline noise over the prior art pulser circuit described above. The embodiment of this invention which was operated and tested was stable and suffered a degradation of gain of only 3 db. when operated for an extended time interval over a temperature range of 0° C. to 100° C.

I claim:

1. A pulser comprising:
an energy source;
a delay line storage element coupled to said source for storing energy;
a gate network having opposite ends thereof,
an output circuit;
switch means connected to said storage element for selectively dumping the energy stored by said element;
first means coupling said switch means and said storage element to one end of said gate network;
second means coupling said output circuit to the other end of said gate network;
said gate network passing signal voltages of one polarity passed by said switching means to said output circuit and bypassing from said output circuit signal voltages of the opposite polarity; and
said first and second means transforming the characteristic impedances of circuits connected to the associated ends of said gate network to larger impedances with respect to impedances of said gate network.

2. The pulser according to claim 1 wherein said switch means comprises an avalanche transistor having its emitter electrode directly electrically connected to a reference potential.

3. The pulser according to claim 1 wherein said gate network comprises s a first diode electrically connected in series between the opposite ends of said network and a second diode electrically connected between one terminal of said first diode and a reference potential.

4. The pulser according to claim 3, including a first resistor connected in parallel with said second diode.

5. The pulser according to claim 4 wherein said output circuit comprises:
a third diode;
a second resistor connected in series between one terminal of said third diode and said second means; and
a capacitor electrically connected in parallel with said second resistor to enhance cut off of said third diode when a signal of the opposite polarity is passed by said gate network.

6. The pulser according to claim 5 wherein said delay line is an open circuited coaxial transmission line.

7. The pulser according to claim 6 wherein said first and second coupling means are impedance transformers.

8. The pulser according to claim 7 wherein said switch means comprises an avalanche transistor having its emitter electrode directly electrically connected to a reference potential.